, 2017

United States Patent
Hirasawa

(10) Patent No.: US 9,623,868 B2
(45) Date of Patent: Apr. 18, 2017

(54) HYBRID VEHICLE

(71) Applicant: Toyota Jidosha Kabushiki Kaisha, Toyota-shi, Aichi-ken (JP)

(72) Inventor: Takahiko Hirasawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/071,775

(22) Filed: Mar. 16, 2016

(65) Prior Publication Data

US 2016/0272195 A1 Sep. 22, 2016

(30) Foreign Application Priority Data

Mar. 18, 2015 (JP) ................................. 2015-054355

(51) Int. Cl.
| | |
|---|---|
| *B60K 6/365* | (2007.10) |
| *B60K 6/383* | (2007.10) |
| *B60K 6/48* | (2007.10) |
| *B60W 10/06* | (2006.01) |
| *B60W 10/08* | (2006.01) |
| *B60W 20/50* | (2016.01) |
| *B60W 50/14* | (2012.01) |

(52) U.S. Cl.
CPC .............. *B60W 20/50* (2013.01); *B60K 6/365* (2013.01); *B60K 6/383* (2013.01); *B60K 6/48* (2013.01); *B60W 10/06* (2013.01); *B60W 10/08* (2013.01); *B60W 50/14* (2013.01); *B60W 2710/06* (2013.01); *B60W 2710/08* (2013.01); *B60Y 2200/92* (2013.01); *Y10S 903/91* (2013.01); *Y10S 903/913* (2013.01); *Y10S 903/93* (2013.01)

(58) Field of Classification Search
CPC ...... B60W 20/50; B60W 50/14; B60W 10/06; B60W 10/08; B60W 2710/06; B60W 2710/08; B60K 6/48; B60K 6/383; B60K 6/365; B60Y 2200/92; Y10S 903/93; Y10S 903/91; Y10S 903/913
USPC ............ 701/22; 180/65.21; 192/30 W, 12 B; 475/5, 2
See application file for complete search history.

(56) References Cited

U.S. PATENT DOCUMENTS

| | | | |
|---|---|---|---|
| 5,433,282 A * | 7/1995 | Moroto ................... | B60K 6/365 180/65.21 |
| 6,722,456 B2 * | 4/2004 | Hisada ................... | B60K 6/445 180/65.235 |
| 2002/0017406 A1 | 2/2002 | Hisada | |

FOREIGN PATENT DOCUMENTS

JP 2002-012046 A 1/2002

* cited by examiner

*Primary Examiner* — Marthe Marc-Coleman
(74) *Attorney, Agent, or Firm* — Dinsmore & Shohl LLP

(57) ABSTRACT

A hybrid vehicle is provided with an one-way clutch configured to prevent the reverse rotation of an engine, a power split device, a display unit configured to notify a driver of a warning message, and an ECU configured to control the engine, the display unit and a motor generator. The ECU controls the display unit to notify the driver of a warning message that the vehicle is not allowed to make reverse moving when a malfunction occurs. In the case where a malfunction occurs, the output shaft cannot rotate reversely if the reverse rotation of the engine is prevented by the one-way clutch.

5 Claims, 3 Drawing Sheets

FIG.4 <PG LOCKED STATE>
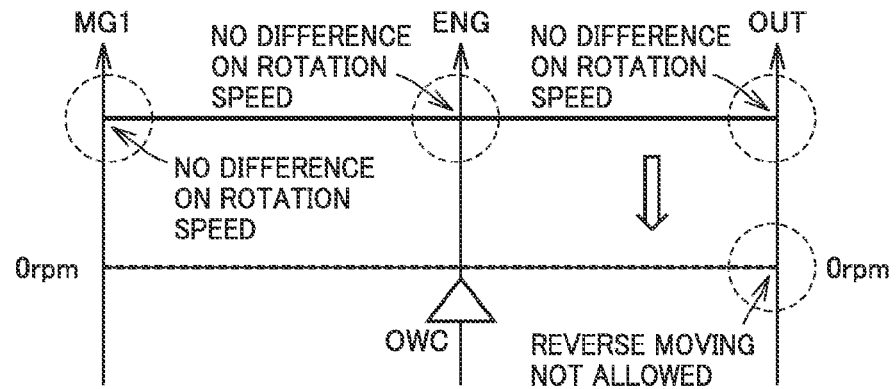
FIG.5
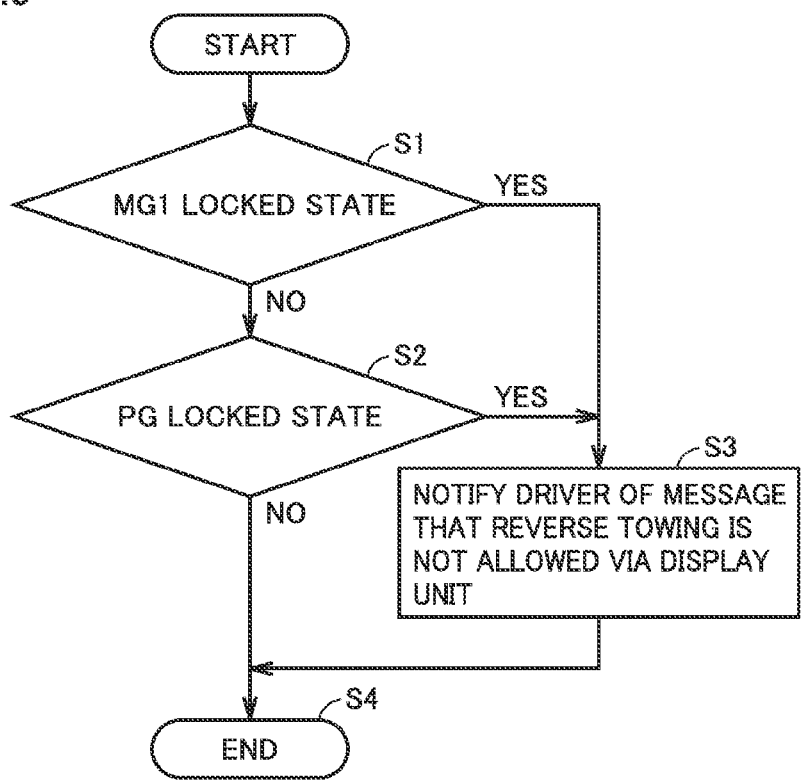

HYBRID VEHICLE

CROSS-REFERENCE TO RELATED APPLICATIONS

This non-provisional application is based on Japanese Patent Application No. 2015-054355 filed on Mar. 18, 2015 with the Japan Patent Office, the entire contents of which are hereby incorporated by reference.

BACKGROUND

Technical Field

The present specification relates to a hybrid vehicle, and particularly relates to a hybrid vehicle provided with an internal combustion engine and an one-way clutch configured to prevent the reverse rotation of the internal combustion engine.

Description of the Background Art

There is known such a hybrid vehicle that is configured to include an internal combustion engine (engine), a first and a second rotating electric machines (motor generators), and an one-way clutch configured to prevent the reverse rotation of the internal combustion engine and provided between a rotation shaft of the internal combustion engine and a power split device.

Japanese Patent Laying-Open No. 2002-12046 discloses an example of such vehicle. In the vehicle, in order to prevent the engine from being driven to rotate in the reverse direction along with the motor generator, an one-way clutch is provided between a casing and an output shaft, to which the rotation of the engine is transmitted.

According to the vehicle disclosed in Japanese Patent Laying-Open No. 2002-12046, when a motor torque is generated by the motor generator in the direction of lowering the engine rotation speed, in the case where the engine rotation speed takes a negative value, it is determined that a malfunction has occurred on the one-way clutch.

However, even though the occurred malfunction is not firstly present on the one-way clutch, if the vehicle is made to move under a malfunctioning state, an unnecessary force may be applied to the one-way clutch, resulting a damage to the one-way clutch.

In such case, it is desirable to notify the driver about the malfunction before the damage to the one-way clutch occurs. On the other hand, if the vehicle totally goes out of operation to prevent damage to the one-way clutch, it is not possible to perform escape running. It is desirable to allow the driver to make escape running.

Moreover, even when the vehicle is not moving on its own power but is being towed, the one-way clutch may be damaged depending on the towing direction, and thereby it is necessary to prevent the one-way clutch from being damaged.

SUMMARY

The present specification has been made to solve the abovementioned problems, and it is therefore an object of the present specification to provide a hybrid vehicle that allows the vehicle to move when a malfunction has occurred while preventing an one-way clutch from being damaged.

In summary, the present specification provides a hybrid vehicle which includes an internal combustion engine, a first rotating electric machine, an one-way clutch, power split device, a notification unit, and an electronic control unit configured to control the internal combustion engine, the first rotating electric machine and the notification unit. The one-way clutch is provided on a rotation shaft of the internal combustion engine, and is configured to prevent the reverse rotation of the internal combustion engine. The power split device is coupled to a rotation shaft of the first rotating electric machine and a rotation shaft of the internal combustion engine and an output shaft for driving a drive wheel, and is configured to transmit the driving force from the first rotating electric machine and the internal combustion engine to the drive wheel. The notification unit is configured to notify a driver of a warning message. The electronic control unit controls the notification unit to notify the driver of a warning message that the vehicle is not allowed to make reverse moving when a malfunction occurs. In the case where the malfunction occurs, the output shaft cannot rotate reversely if the reverse rotation of the internal combustion engine is prevented by the one-way clutch.

Since the electronic control unit performs the control as described above, it is possible to prevent the one-way clutch from encountering a secondary malfunction resulted from the previous malfunction.

In some embodiments, the electronic control unit controls the notification unit to notify the driver of a warning message that the vehicle is not allowed to be towed to make reverse moving.

Even though the driver can avoid driving the vehicle to move reversely, in the case where the vehicle is being towed, it is considered that in many cases the driver may not pay attention to the moving direction of the vehicle. In addition, the reverse moving can be prohibited by setting the shift lever not to perform the reverse moving in a control, but it is difficult to prevent the vehicle in the control from performing reverse moving when it is being towed in the event of a malfunction. By making the notification as described above, the driver or the operator who tows the vehicle can be easily noticed that the vehicle should not be towed to move in the reverse direction, and thereby it is possible to provide further protection to the one-way clutch.

In some embodiments, the malfunction includes a lock malfunction that the rotation shaft of the first rotating electric machine is locked. Thus, even in the case where the lock malfunction has occurred in the first rotary electric machine, it is still possible to provide protection to the one-way clutch.

In some embodiments, the malfunction includes a lock malfunction that the power split device is locked to such a state that no difference is present between the rotation speed of the rotation shaft of the first rotating electric machine and the rotation speed of the rotation shaft of the internal combustion engine. Thus, even in the case where the lock malfunction has occurred in the power split device, it is still possible to provide protection to the one-way clutch.

In some embodiments, the hybrid vehicle further includes a second rotating electrical machine configured to rotate together with the output shaft. Thereby, even for a vehicle further equipped with a second rotating electric machine in addition to the first rotary electric machine, it is still possible to provide protection to the one-way clutch.

According to the present specification, at a time where a malfunction has occurred, the driver is notified about the danger that further operation may cause damage to the one-way clutch before the one-way clutch encounters any further malfunction, it is possible to prevent the one-way clutch from encountering any secondary malfunction. The foregoing and other objects, features, aspects and advantages of the present specification will become more apparent from the following detailed description of the present specification when taken in conjunction with the accompanying drawings.

BRIEF DESCRIPTION OF THE DRAWINGS

FIG. 4 is a collinear diagram illustrating the rotation speed of the power split device in a PG locked state.

FIG. 5 is a flow chart for explaining controls performed to display a warning message.

DESCRIPTION OF THE PREFERRED EMBODIMENTS

Figure 1:
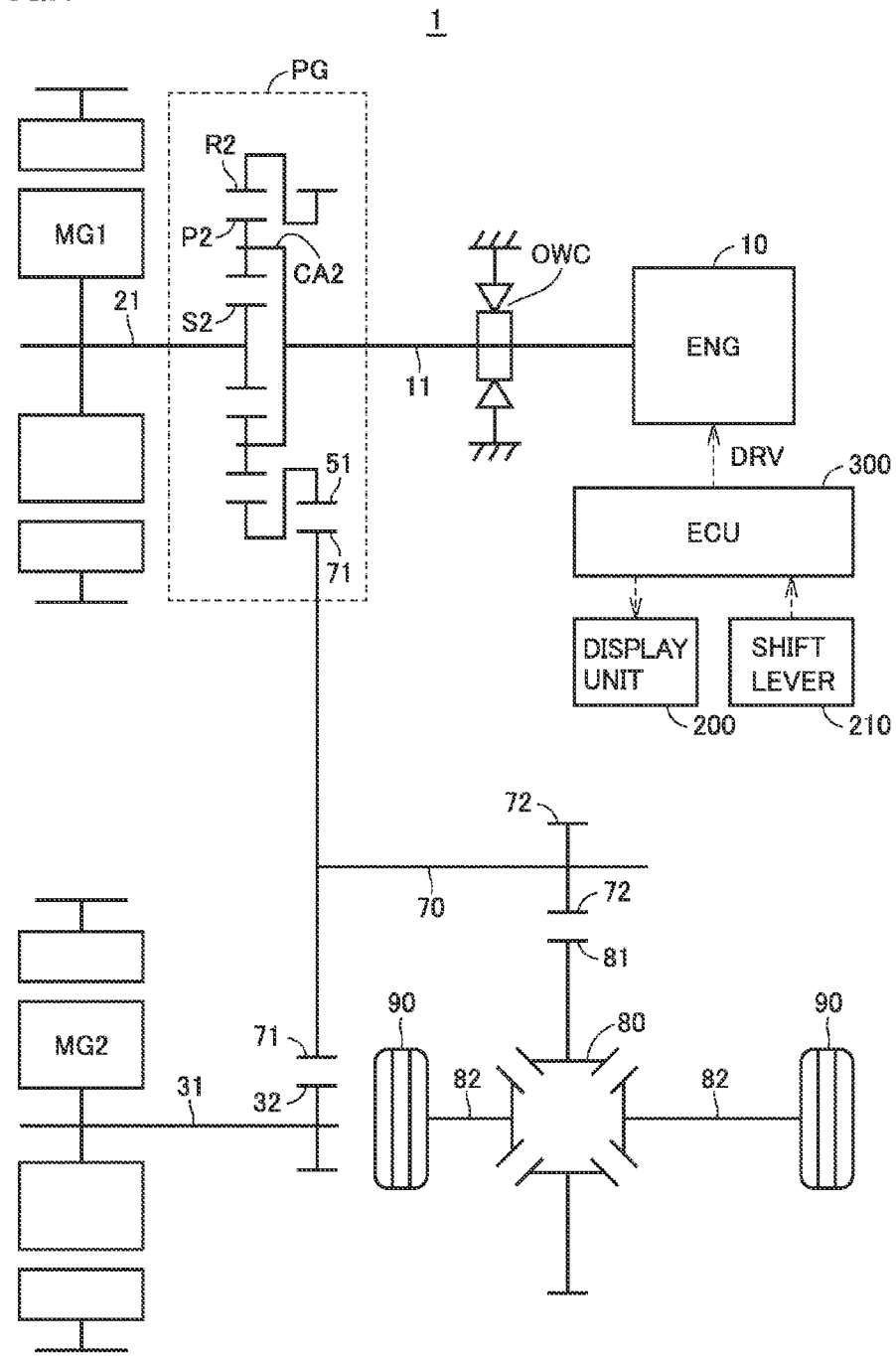
FIG. 1 is a diagram illustrating an overall configuration of a hybrid vehicle according to an embodiment.

Hereinafter, an embodiment of the present specification will be described in detail with reference to the drawings. The same or corresponding components in the drawings will be assigned with the same reference numerals, and the description thereof will not be repeated.

FIG. 1 is a diagram illustrating an overall configuration of a hybrid vehicle 1 according to the present embodiment. Hybrid vehicle 1 includes an engine 10, a motor generator MG1, a motor generator MG2, a power split device (planetary gear device) PG, a counter shaft (output shaft) 70, a differential gear system 80, drive wheels 90, a shift lever 210, a display unit 200, and an ECU (Electronic Control Unit) 300.

Hybrid vehicle 1 is an FF-type (front-engine and front-drive) hybrid vehicle which moves by using power from at least one of engine 10, motor generator MG1 and motor generator MG2. Hybrid vehicle 1 is not limited to the FF type, it may be an FR (front-engine and rear-drive) type. Further, hybrid vehicle 1 may be a plug-in hybrid vehicle mounted with a battery (not shown) which can be charged by using an external power source.

Engine 10 is for example an internal combustion engine such as a gasoline engine or a diesel engine. Engine 10 is controlled by a control signal DRV from ECU 300.

Motor generator MG1 and motor generator MG2 each is a permanent magnet type synchronous motor including for example a rotor with a permanent magnet embedded therein. A rotation shaft 21 of motor generator MG1 is disposed coaxially with a crank shaft 11 of engine 10. A rotation shaft 31 of motor generator MG2 is disposed parallel to rotation shaft 21 of motor generator MG1. Counter shaft (output shaft) 70 is disposed parallel to rotation shaft 21 of motor generator MG1 and rotation shaft 31 of motor generator MG2.

Motor generator MG1 and motor generator MG2 each is driven by an inverter (not shown). The inverter is controlled by a control signal from ECU 300 so as to convert DC power from the vehicle battery (not shown) to AC power and supply the AC power to motor generators MG1 and MG2. Motor generator MG2 may be driven by electric power generated by motor generator MG1.

Power split device PG is a single pinion typed planetary gear device which includes a sun gear S2, a pinion gear P2, a ring gear R2 and a carrier CA2. Carrier CA2 of power split device PG is coupled to crankshaft 11 of engine 10.

Pinion gear P2 is disposed between sun gear S2 and ring gear R2, meshing with sun gear S2 and ring gear R2, respectively. Pinion gear P2 is supported by carrier CA2, capable of undergoing rotation and revolution.

Sun gear S2 is coupled to rotation shaft 21 of motor generator MG1. Ring gear R2 is coupled to a counter drive gear 51. Counter drive gear 51 is an output gear of power split device PG, rotating together with ring gear R2.

Figure 2:
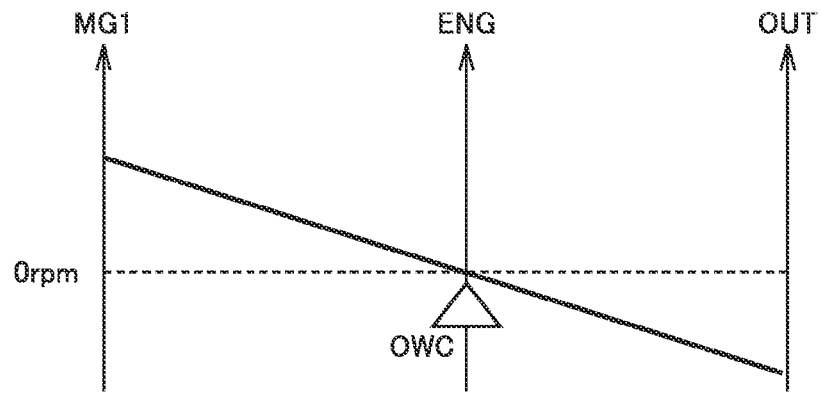
FIG. 2 is a collinear diagram illustrating the rotation speed of a power split device during reverse moving of the vehicle in a normal state.
Figure 3:
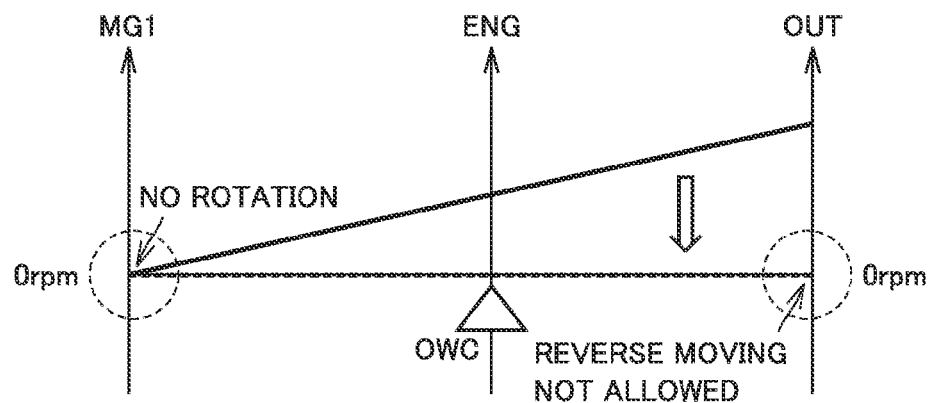
FIG. 3 is a collinear diagram illustrating the rotation speed of the power split device in a MG1 locked state.

As illustrated in FIGS. 2 to 4 to be described below, the rotation speed of sun gear S2 (i.e., the rotation speed of motor generator MG1), the rotation speed of carrier CA2 and the rotation speed of ring gear R2 satisfy a linear relationship on the collinear diagram (i.e., once any two of the rotation speeds are determined, the last rotation speed is also determined). Therefore, by adjusting the rotation speed of motor generator MG1, it is possible to alter the ratio between the rotation speed of ring gear R2 and the rotation speed of carrier CA2 continuously.

Counter shaft (output shaft) 70 is provided with a counter driven gear 71 and a differential drive gear 72. Counter driven gear 71 meshes with counter drive gear 51 of power split device PG. In other words, the power from engine 10 and motor generator MG1 can be transmitted to counter shaft (output shaft) 70 via counter drive gear 51 of power split device PG.

Power split device PG is connected to a point in a power transmission path from engine 10 to counter shaft (output shaft) 70. Therefore, after the rotation of engine 10 is gear-shifted in power split device PG, it is transmitted to counter shaft (output shaft) 70.

Counter driven gear 71 meshes with a reduction gear 32 coupled to rotation shaft 31 of motor generator MG2. In other words, the power of motor generator MG2 can be transmitted to counter shaft (output shaft) 70 via reduction gear 32.

Differential drive gear 72 meshes with a differential ring gear 81 disposed in differential gear system 80. Differential gear system 80 is coupled to right and left drive wheels 90 through right and left drive shafts 82, respectively. In other words, the rotation of counter shaft (output shaft) 70 can be transmitted to the right and left drive shafts 82 through differential gear system 80.

ECU 300 includes a CPU (Central Processing Unit), a storage device, an input buffer and an output buffer (none of them is shown in FIG. 1), and is configured to receive signal input from each sensor, output control signals to each device so as to control hybrid vehicle 1 and each device. Note that the control is not limited to be performed via a software but may be performed by using a dedicated hardware (such as an electronic circuit).

In hybrid vehicle 1 illustrated in FIG. 1, crank shaft 11 of engine 10 is provided with an one-way clutch OWC. One-way clutch OWC prevents the reverse rotation of engine 10. Thus, in an attempt to move the vehicle rearward, with the help of one-way clutch OWC, the vehicle can be moved rearward simply by reversely rotating motor generator MG2 without performing any control on engine 10 and motor generators MG1.

In the present embodiment, in order to prevent one-way clutch OWC from encountering a secondary malfunction, any operation that should be prohibited immediately after the occurrence of the initial malfunction will be notified to the driver. Hereinafter, the relationship between one-way clutch OWC and the rotation speed of each rotary element of power split device PG in the normal state and in the malfunctioned state will be described respectively.

FIG. 2 is a collinear diagram illustrating the rotation speed of a power split device during reverse moving of the vehicle in the normal state. In FIG. 2, the rotation speed of rotation shaft 21 of motor generator MG1 is indicated by "MG1", the rotation speed of crank shaft 11 of engine 10 is indicated by "ENG", and the rotation speed of the output shaft (ring gear R2) of the power split device is indicated by "OUT".

With reference to FIGS. 1 and 2, during the reverse moving, engine 10 is controlled at a fuel-cut state, and motor generator MG1 is controlled at a state free of outputting any torque. When motor generator MG2 is made to perform reverse rotation, the rotation speed OUT takes a negative value accordingly. In this case, due to the presence of one-way clutch OWC, the rotation speed ENG of engine 10 takes zero instead of taking a negative value. The rotation speed of motor generator MG1 is determined by the straight line defined by the rotation speed OUT and the rotation speed ENG on the collinear diagram.

FIG. 3 is a collinear diagram illustrating the rotation speed of the power split device in a MG1 locked state. The MG1 locked state refers to such a state that a malfunction has occurred and thereby the rotation speed of motor generator MG1 in FIG. 1 is fixed to zero. For example, such malfunction will occur if a shaft bearing or the like of motor generator MG1 is damaged.

As illustrated by the solid line in FIG. 3, in the MG1 locked state, the rotation speed OUT of the output shaft may take a positive value (forward moving). However, due to the presence of one-way clutch OWC, in the MG1 locked state, the rotation speed is limited to 0 rpm as indicated by the broken line in FIG. 3, and thus the rotation speed OUT of the output shaft cannot take a negative value (reverse moving). This indicates that not only in the case where hybrid vehicle 1 is made to perform reverse moving by motor generator MG2 but also in the case where hybrid vehicle 1 is towed to perform reverse moving by another towing vehicle, one-way clutch OWC may be damaged.

FIG. 4 is a collinear diagram illustrating the rotation speed of the power split device in a PG locked state. The PG locked state refers to such a state that a malfunction has occurred and thereby no difference is present between the three rotational elements of power split device PG in FIG. 1. For example, such malfunction will occur if a foreign matter is engaged between sun gear S2 and pinion gear P2 of power split device PG or a foreign matter is engaged between pinion gear P2 and ring gear R2 of power split device PG. In the PG locked state, the collinear diagram can be moved in the vertical direction with the three rotational elements rotating at the same rotation speed.

As illustrated by the solid line in FIG. 4, in the PG locked state, the rotation speed OUT of the output shaft may take a positive value (forward moving). However, due to the presence of one-way clutch OWC, in the PG locked state, the rotation speed is limited to 0 rpm as indicated by the broken line in FIG. 4, and thus the rotation speed OUT of the output shaft cannot take a negative value (reverse moving). This indicates that not only in the case where hybrid vehicle 1 is made to perform reverse moving by motor generator MG2 but also in the case where hybrid vehicle 1 is towed to perform reverse moving by another towing vehicle, one-way clutch OWC may be damaged.

Thereby, in the present embodiment, when a malfunction occurs the driver will be notified of a warning message that the vehicle is not allowed to make reverse moving through display unit 200. In the case where the malfunction occurs, output shaft 70 cannot rotate reversely if the reverse rotation of engine 10 is prevented by one-way clutch OWC. Moreover, in some embodiments the warning message includes a message indicating that the reverse moving is not allowed even when the vehicle is to be towed.

For example, t in addition to such message that "A malfunction has occurred, and thereby the vehicle is not allowed to perform reverse moving.", another message such as "When towing the vehicle, please tow it only in the forward direction." or "When towing the vehicle, please do not tow it in the rearward direction." are displayed on display unit 200 in some embodiments.

FIG. 5 is a flow chart for explaining controls performed to display a warning message. The process of the flowchart is executed for each predetermined time interval or when a predetermined condition is satisfied. With reference to FIGS. 1 and 5, firstly, ECU 300 determines whether or not the vehicle is in the MG1 locked state.

Hybrid vehicle 1 is provided with a rotation sensor (not shown) such as a resolver for detecting the rotation speed of motor generator MG1. For example, ECU 300 determines that the vehicle is in the MG1 locked state in the case where even though motor generator MG1 is controlled to rotate, the rotation speed thereof detected by the rotation continues to be zero. It should be noted that the MG1 locked state may be detected in a previous time. In this case, the determination may be made based on whether or not a malfunction flag corresponding to the MG1 locked state is set to "1".

At step S1, if it is determined that the vehicle is in the MG1 locked state (YES at S1), ECU 300 proceeds the process from step S1 to step S3. On the other hand, at step S1, if it is determined that the vehicle is not in the MG1 locked state (NO at S1), ECU 300 proceeds the process from step S1 to step S2.

At step S2, ECU 300 determines whether or not the vehicle is in the PG locked state. In addition to the resolver for detecting the rotation speed of motor generator MG1, hybrid vehicle 1 is further provided with a crank angle sensor for detecting the rotation speed of engine 10 and a rotation sensor for detecting the rotation speed of output shaft 70. For example, ECU 300 determines that the vehicle is in the PG locked state in the case where at the time of starting, when motor generator MG2 is rotated so as to move the vehicle forward, the rotation speed of engine 10 and the rotation speed of motor generator MG1 both vary unintendedly in the same manner as that indicated by the solid line in the collinear diaphragm of FIG. 4. It should be noted that the PG locked state may be detected in a previous time. In this case, the determination may be made based on whether or not a malfunction flag corresponding to the PG locked state is set to "1".

At step S2, if it is determined that the vehicle is in the PG locked state (YES at S2), ECU 300 proceeds the process from step S2 to step S3. On the other hand, at step S2, if it is determined that the vehicle is not in the PG locked state (NO at S2), ECU 300 proceeds the process from step S2 to step S4.

At step S3, ECU 300 controls display unit 200 provided in the vicinity of a speed meter to notify the driver of the occurrence of a malfunction and display a message indicating that no reverse towing is allowed, and meanwhile list some example operations that may cause a secondary malfunction and prompt the driver not to perform such operations.

Finally, the present embodiment will be summarized with reference to FIG. 1 again. Hybrid vehicle 1 includes engine 10, motor generator MG1, one-way clutch OWC, power split device PG, display unit 200, and ECU 300 configured to control engine 10 and motor generator MG1 and display unit 200.

One-way clutch OWC is provided on crank shaft 11 of engine 10, and is configured to prevent the reverse rotation of engine 10. Power split device PG is coupled to output shaft 70 which drives rotation shaft 21 of motor generator MG1, crank shaft 11 of engine 10 and drive wheels 90, and thereby transmits the driving power from motor generator MG1 and engine 10 to drive wheels 90. Display unit 200 is configured to notify the driver of a warning message.

ECU 300 controls display unit 200 to notify the driver of a warning message that the vehicle is not allowed to make reverse moving when a malfunction occurs. In the case where the malfunction occurs, output shaft 70 cannot rotate reversely if the reverse rotation of engine 10 is prevented by one-way clutch OWC.

Since ECU 300 performs the control as described above, it is possible to prevent one-way clutch OWC from encountering a secondary malfunction resulted from the previous malfunction. Although the notification is described as being displayed on display unit 200 as an example, the notification may be provided by a notification unit using sounds.

In some embodiments, a warning message that the reverse moving is not allowed, ECU 300 notifies that the reverse moving is not allowed even though the vehicle is to be towed.

Even though the driver can avoid driving the vehicle to move reversely, in the case where the vehicle is being towed, it is considered that in many cases the driver may not pay attention to the moving direction of the vehicle. In addition, the reverse moving can be prohibited by setting shift lever 210 not to perform the reverse moving in a control, it is difficult to prevent the vehicle in the control from performing reverse moving when it is being towed in the event of a malfunction. By making the notification as described above, the driver or the operator who tows hybrid vehicle 1 can be easily noticed that the vehicle should not be towed to move in the rearward direction, and thereby, it is possible to provide further protection to one-way clutch OWC.

In some embodiments, the malfunction includes a lock malfunction that rotation shaft 21 of motor generator MG1 is locked. Thus, even in the case where the lock malfunction has occurred in motor generator MG1, it is still possible to provide protection to the one-way clutch.

In some embodiments, the malfunction includes a lock malfunction that power split device PG is locked to such a state that no difference is present between the rotation speed of rotation shaft 21 of motor generator MG1 and the rotation speed of engine 10. Thus, even in the case where the lock malfunction has occurred in power split device PG, it is still possible to provide protection to one-way clutch OWC.

Motor generator MG2 is not an obligatory component of the vehicle, but in some embodiments, hybrid vehicle 1 further includes motor generator MG2 configured to rotate together with output shaft 70. Thereby, even for a vehicle further equipped with motor generator MG2 in addition to motor generator MG1, it is still possible to provide protection to one-way clutch OWC.

Although the present disclosed subject matter has been described and illustrated in detail, it is clearly understood that the same is by way of illustration and example only and is not to be taken by way of limitation, the scope of the present specification being interpreted by the terms of the appended claims.

What is claimed is:

1. A hybrid vehicle comprising:
   an internal combustion engine;
   a first rotating electric machine;
   an one-way clutch provided on a rotation shaft of said internal combustion engine, and configured to prevent the reverse rotation of said internal combustion engine;
   a power split device coupled to a rotation shaft of said first rotating electric machine, a rotation shaft of said internal combustion engine and an output shaft for driving a drive wheel, and configured to transmit the driving force from said first rotating electric machine and said internal combustion engine to said drive wheel;
   a notification unit configured to notify a driver of a warning message; and
   an electronic control unit configured to control said internal combustion engine, said first rotating electric machine and said notification unit,
   said electronic control unit controlling said notification unit to notify the driver of a warning message that the vehicle is not allowed to make reverse moving when a malfunction occurs,
   in the case where the malfunction occurs, said output shaft cannot rotate reversely if the reverse rotation of said internal combustion engine is prevented by said one-way clutch.

2. The hybrid vehicle according to claim 1, wherein said electronic control unit controls said notification unit to notify the driver that the vehicle is not allowed to be towed to make reverse moving as the warning message.

3. The hybrid vehicle according to claim 1, wherein said malfunction includes a lock malfunction that said rotation shaft of said first rotating electric machine is locked.

4. The hybrid vehicle according to claim 1, wherein said malfunction includes a lock malfunction that said power split device is locked to such a state that no difference is present between the rotation speed of said rotation shaft of said first rotating electric machine and the rotation speed of said rotation shaft of said internal combustion engine.

5. The hybrid vehicle according to claim 1, further including a second rotating electrical machine configured to rotate together with said output shaft.

* * * * *